United States Patent
Beardsley et al.

(10) Patent No.: US 10,135,601 B1
(45) Date of Patent: Nov. 20, 2018

(54) PROVIDING COMMON POINT OF CONTROL AND CONFIGURATION IN IP-BASED TIMING SYSTEMS

(71) Applicant: Disney Enterprises, Inc., Burbank, CA (US)

(72) Inventors: Craig L. Beardsley, Chicago, IL (US); Michael J. Strein, Bohemia, NY (US); Vladislav Feldman, Manhasset Hills, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/596,425

(22) Filed: May 16, 2017

(51) Int. Cl.
*H04L 7/00* (2006.01)
*H04J 3/06* (2006.01)
*H04L 29/06* (2006.01)

(52) U.S. Cl.
CPC .......... *H04L 7/0037* (2013.01); *H04J 3/0673* (2013.01); *H04L 7/0012* (2013.01); *H04L 65/608* (2013.01)

(58) Field of Classification Search
CPC ... H04L 7/0037; H04L 7/0012; H04L 65/608; H04J 3/0673
See application file for complete search history.

(56) References Cited

U.S. PATENT DOCUMENTS

| | | | |
|---|---|---|---|
| 5,122,679 A * | 6/1992 | Ishii | G06F 1/10 327/147 |
| 6,069,666 A * | 5/2000 | Lyons | H04N 5/126 348/512 |
| 6,173,422 B1 * | 1/2001 | Kimura | G06F 11/0736 348/180 |
| 6,370,159 B1 * | 4/2002 | Eidson | G06F 1/14 370/503 |
| 6,426,984 B1 * | 7/2002 | Perino | G06F 1/10 375/356 |
| 2004/0133919 A1 * | 7/2004 | Incentis | G11B 27/322 725/112 |
| 2006/0050772 A1 * | 3/2006 | Shemesh | G04R 20/14 375/145 |
| 2010/0074278 A1 * | 3/2010 | Dobjelevski | H04J 3/0673 370/503 |
| 2011/0185216 A1 * | 7/2011 | Zhao | G06F 1/14 713/401 |
| 2013/0343409 A1 * | 12/2013 | Haulin | H04J 3/0697 370/503 |
| 2016/0211935 A1 * | 7/2016 | Fair | G06F 1/12 |

(Continued)

*Primary Examiner* — Jean B Corrielus
(74) *Attorney, Agent, or Firm* — Patterson + Sheridan, LLP

(57) ABSTRACT

Embodiments herein describe a common point of control of local clocks in endpoint devices in a media production studio that are synchronized using an IP-based synchronization protocol. In one embodiment, a master clock generator outputs a master clock signal which is distributed to the endpoint devices in the media production studio. The endpoint devices include local clock generators that convert the master clock into an adjusted clock. A clock manager provides a common point of control for the local clock generators in the endpoints. The clock manager includes an input/output (I/O) interface which enables an engineer to adjust the jam time of the local clock generators as well as adjust a delay used when outputting media content to another endpoint device.

16 Claims, 6 Drawing Sheets

(56) References Cited

U.S. PATENT DOCUMENTS

| | | | | |
|---|---|---|---|---|
| 2016/0352500 A1* | 12/2016 | Benjamini | ................ | H04L 7/04 |
| 2017/0091516 A1* | 3/2017 | Xu | ..................... | G06K 9/00503 |
| 2017/0310576 A1* | 10/2017 | Berry | ...................... | H04L 45/22 |
| 2017/0359139 A1* | 12/2017 | Butterworth | .......... | H04J 3/0661 |
| 2018/0191802 A1* | 7/2018 | Yang | .................... | H04L 65/608 |

* cited by examiner

PROVIDING COMMON POINT OF CONTROL AND CONFIGURATION IN IP-BASED TIMING SYSTEMS

BACKGROUND

Field of the Invention

The embodiments herein are generally directed to controlling clock synchronization in a media production studio using an internet protocol (IP)-based synchronization protocol.

Description of the Related Art

Media production studios (e.g., television studios or film studios) typically use an analog black burst or a Society of Motion Picture & Television Engineers (SMPTE) timecode based timing reference system for generating time codes for streaming videos. Audio production studios can use Word Clock or the Advanced Encryption Standard (AES) to synchronize streaming audio. These timing standards can be used to synchronize video and audio signals in radio and television production and distribution systems. A time of day code can be used to synchronize control systems in the media or audio production studios with a common reference clock.

Traditional systems utilize a central master clock with a time code generator which provides a reference time code, a pulse, and synchronizing signals which are distributed to devices in the production studio. These signals are used to lock video and audio processing devices so that the signals may be cleanly mixed, switched, edited, and otherwise manipulated in production and assembly for distribution. These time and reference signals also drive automation systems to provide accurate timed control and switching of sources in television distribution systems. The central master clock can be adjusted to account for corrections such as daily time correction, leap seconds, and daylight savings. Adjustments made to the central master clock are automatically (and immediately) propagated to the clocks of the equipment in the production studio without any adjustments needing to be made on the equipment itself. That is, the use of a time distribution network allows these systems to change the timing parameters by adjusting the master reference generator and clock while all the local clocks in the video and processing devices are instantly adjusted to the new settings.

SUMMARY

One embodiment described herein is a method that includes distributing a master clock signal using an internet protocol (IP)-based synchronization protocol to a plurality of endpoint devices in a media production studio and generating, based on the master clock signal, local clock signals using local clock generators on the plurality of endpoint devices where the local clock signals are used for at least one of generating and processing streaming media data in the plurality of endpoint devices. The method includes receiving a timing adjustment from a clock manager communicatively coupled to the plurality of endpoint devices where the clock manager is a common point of control of the local clock generators and adjusting the local clock signals on the plurality of endpoint devices based on the received timing adjustment.

Another embodiment described herein is a non-transitory computer readable storage medium that includes computer-readable program code for verifying a media presentation, where, when executed by a computing processor, the computer-readable program code performs an operation. The operation includes distributing a master clock signal using an IP-based synchronization protocol to a plurality of endpoint devices in a media production studio and generating, based on the master clock signal, local clock signals using local clock generators on the plurality of endpoint devices where the local clock signals are used for at least one of generating and processing streaming media data in the plurality of endpoint devices. The operation includes receiving a timing adjustment from a clock manager communicatively coupled to the plurality of endpoint devices where the clock manager is a common point of control of the local clock generators and adjusting the local clock signals on the plurality of endpoint devices based on the received timing adjustment.

Another embodiment described herein is a media production studio that includes a plurality of endpoint devices and a master clock generator configured to distribute a master clock signal using an IP-based synchronization protocol to the plurality of endpoint devices where the plurality of endpoint devices are configured to generate, based on the master clock signal, local clock signals using local clock generators and where the local clock signals are used for at least one of generating and processing streaming media data in the plurality of endpoint devices. The media production studio also includes a clock manager configured to transmit a timing adjustment to the plurality of endpoint devices, wherein the clock manager is a common point of control of the local clock generators, wherein the local clock generators are configured to adjust the local clock signals on the plurality of endpoint devices based on the received timing adjustment.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
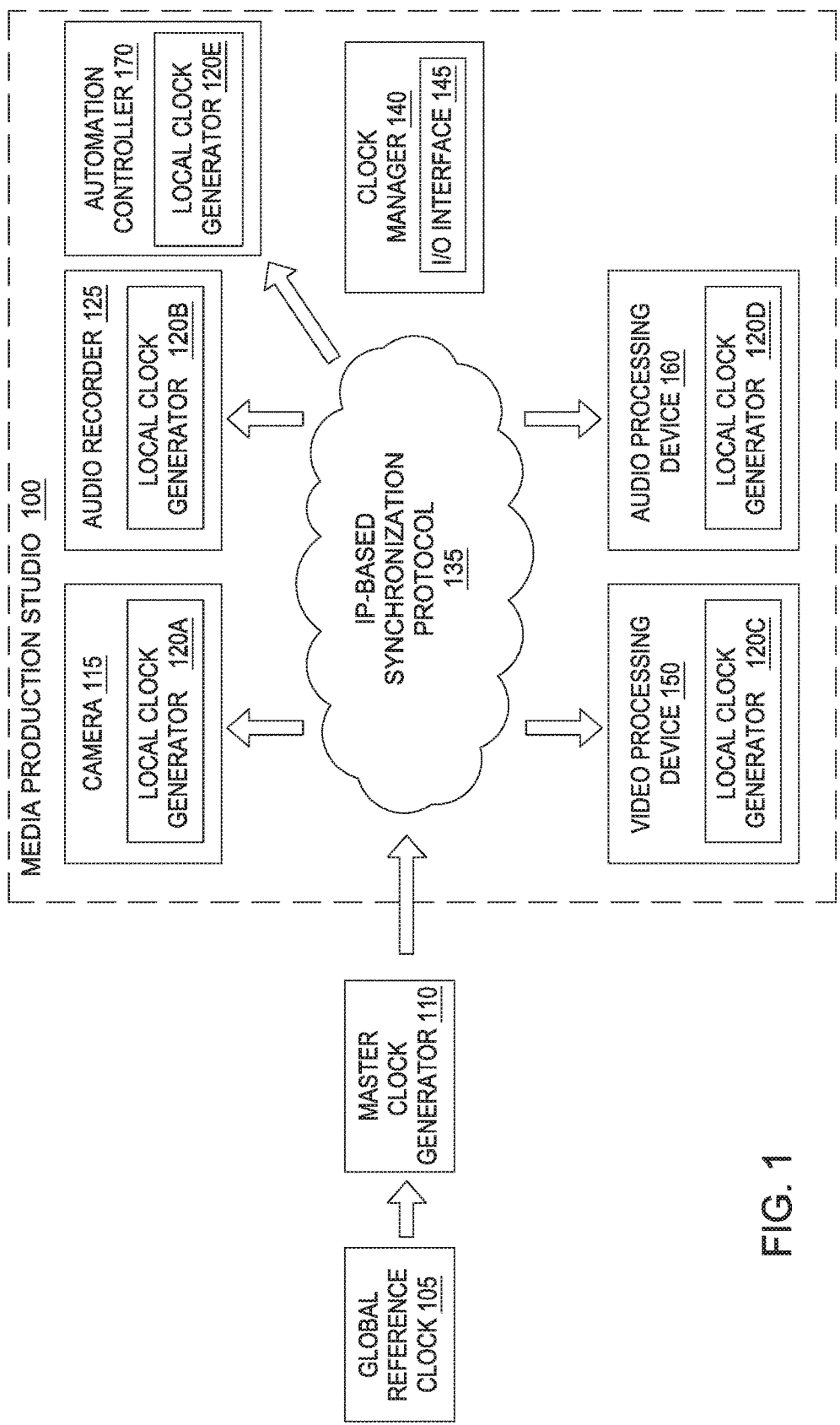
FIG. 1 illustrates a system for synchronizing clocks in a media production studio, according to one embodiment described herein.

Embodiments herein describe a common point of control of local clocks in endpoint devices in a media production studio that are synchronized using an IP-based synchronization protocol. Unlike traditional clock synchronization techniques such as black burst or Work Clock which rely on transmitting analog timing signals, the embodiments herein use an IP-based synchronization protocol that rely on digital signals to synchronize local clock signals on endpoint devices. In one embodiment, a master clock generator outputs a master clock signal which is distributed to the endpoint devices in the media production studio. The endpoint devices include local clock generators that convert the master clock into an adjusted clock. For example, the master clock may be based on International Atomic Time (TAI) which the local clock generators convert into Coordinated Universal Time (UTC). In addition, the local clock generators can lock onto a frequency of the master clock in order to create the necessary timing and synchronization signals for creation of video and audio streams.

The local clock generators can use the adjusted clock to generate time codes (or frame codes) which can uniquely identify video frames in a media presentation (e.g., a live sports broadcast, a pre-recorded television show, an advertisement, movie, etc.). The time codes enable the endpoint devices to, for example, mix two video streams or mix audio and video streams to generate media content that is immediately viewable by a user (either via a live broadcast or via a video-by-demand service). Moreover, a delay adjustment can be used to adjust when two video streams arrive at a processing unit so that video stream can be combined properly, e.g., when placing a picture in a picture or inserting a snipe or advertisement. However, using an IP-based synchronization protocol means the local clock generators may not be slaved to the master clock, and thus, do not immediately adjust when the master clock is changed. Instead, the local clock generators synch to the master clock at a predefined time referred to herein as a jam time.

Embodiments herein describe a clock manager which provides a common point of control for the local clock generators in the endpoint devices. The clock manager includes an input/output (I/O) interface which enables an engineer to adjust the jam time of the local clock generators as well as adjust the delay for a video output used to perform phasing. In one embodiment, the clock manager pushes out instructions to the local clock generators which can change the predefined jam time or add a new jam time. For example, an engineer can use the clock manager to instruct the local generators to immediately synch their local clock signals to the master clock. In another example, if an inserted video stream is not arranged in a desired location when mixing multiple video streams, the engineer can use the clock manager to adjust a delay corresponding to the video stream to adjust the position of the inserted video stream in the combined video streams.

In one embodiment, the clock manager can adjust timing parameters for some, but not all, of the endpoint devices. For example, the clock manager may adjust timing parameters for only a portion of the endpoint devices in a particular location. Because the endpoint devices are coupled to an IP network, the clock manager can use device addressing to choose which of the endpoint devices receive updated timing parameters. In another embodiment, the clock manager may synchronize the clocks on endpoint devices that are located in different geographic locations (e.g., different production studios) even if these locations are in different time zones. For example, a camera may be located in a first location or time zone while a mixing device and a video processing device are located in a second location or time zone. The clock manager can transmit a jam instruction to synchronize the local clocks on the camera, mixing device, and video processing device to a same clock.

FIG. 1 illustrates a system for synchronizing clocks in a media production studio 100, according to one embodiment described herein. The media production studio 100 receives a master clock signal from a master clock generator 110 which is distributed using an IP-based synchronization protocol 135. In one embodiment, the IP-based synchronization protocol 135 is the Precision Time Protocol (PTP) which can synchronize clocks through a computer network. PTP is typically used in communication networks such as cellular networks and is defined in IEEE Standard 1588. However, SMPTE 2059 has adapted PTP to be used in professional broadcast applications such as the media production studio 100. Although the embodiments herein describe generating a PTP master clock which is then distributed in the media production studio 100, this disclosure is not limited to such. Instead, any other IP-based synchronization protocols can be used such as, for example, updated or new versions of PTP or the Network Time Protocol (NTP).

The master clock generator 110 receives an input from a global reference clock 105 which is used to generate a master clock signal transmitted to the IP-based synchronization protocol 135. In one embodiment, the global reference clock 105 is a global positioning system (GPS) clock which is transmitted from satellites. Although not shown, the master clock generator 110 may include a GPS receiver for receiving the global reference clock 105. GPS provides a very accurate clock frequency that the master clock generator 110 can use to output the master clock.

The IP-based synchronization protocol 135 can use an IP network to distribute the master clock digitally throughout the media production studio 100. In this example, the media production studio 100 includes a camera 115, an audio recorder 125, a video processing device 150, an audio processing device 160, and an automation controller 170 (referred to generally as endpoint devices). However, the IP-based synchronization protocol 135 can distribute the master clock to any endpoint device which generates, mixes, switches, edits, or otherwise processes video or audio data.

Each of the endpoint devices in FIG. 1 (i.e., the camera 115, the audio recorder 125, the video processing device 150, the audio processing device 160, and the automation controller 170) include a local clock generator 120 which receives the master clock distributed by the IP-based synchronization protocol 135. The local clock generators 120 output local clock signals that are used to uniquely identify video frames or audio segments as well as perform phasing so that different streams can be mixed. In one embodiment, the local clock generators 120 may convert a master clock in international atomic time into a UTC time which considers time zones and leap seconds. The local clock generators 120 can also generate unique time codes (or frame codes) that can be assigned to a particular frame. For example, as the camera 115 captures video frames, the camera 115 can use the time codes generated by the local clock generator 120A to assign a unique time code to each of the generated video frames. Although not shown, the video frames can be transmitted between the endpoint devices—e.g., from the camera 115 to the video processing device 150—using an IP data network which may be the same network used by the IP-based synchronization protocol to transmit the master clock. The time code informs the endpoint device receiving the video frame precisely when the frame was captured by the camera 115 which can be used to synchronize the frame to other video streams or an audio stream. The automation controller 170 uses the time codes generated by the local clock generator 120E to queue and play media content (e.g., pre-recorded shows and live content) according to a pre-defined broadcast schedule. That is, the automation controller 170 may use the time codes to control other systems and devices in the media production studio 100 so that the broadcast schedule is followed.

In one embodiment, the local clock generators 120 output a phasing signal that can be used when mixing video streams. For example, the video processing device 150 may receive two video streams from two different cameras. In order to properly mix the video streams, the first pixel on the first line in the frames in each of the video streams may need to be received at the same time. By generating the phasing signal from the master clock, the media production system 100 can minimize offset errors when mixing streams.

One disadvantage of using the IP-based synchronization protocol 135 and the local clock generators 120 is that the system does not have a common point of control like in traditional synchronization systems. For example, when using black burst or other analog synchronization protocols, changes to the master clock are automatically reflected in changes to the local clock signals in the endpoint devices. However, with the IP-based synchronization protocol 135, the local clock generators 120 are not slaved to the master clock such that changes in the master clock do not result in an immediate or automatic change in the local clock signals in the endpoint devices. That is, an engineer could use the master clock generator 110 to change the current value of the master clock, but this change is not reflected in the endpoint devices until these devices reach the predefined jam time when the local clock generators 120 resynchronize the local clock signals to the master clock. However, the jam time could occur once daily which means it could be hours before the change to the master clock is propagated to the local clock signals.

To provide a common control point, the media production studio 100 includes a clock manager 140 which includes an I/O interface 145 for receiving timing adjustments from a person (e.g., an engineer or producer) or a software application. Although not shown in FIG. 1, the clock manager 140 is communicatively coupled to each of the endpoint devices such that the clock manager 140 can update one or more parameters in the local clock generators 120. For example, the clock manager 140 may use a wide access network (WAN) or a local access network (LAN) to send instructions to the local clock generators 120.

When an engineer or software application wants to adjust the local clock signals on the endpoint devices, the engineer or application can provide a timing adjustment using the I/O interface 145. In response, the clock manager 140 can push out an instruction to one or all of the endpoint devices to change the operation of the local clock generators 120. In this manner, the clock manager 140 provides a common control point for the endpoint devices in the studio 100.

The media production studio 100 may be a building or multiple buildings distributed on a campus. In another embodiment, the media production studio 100 can include a plurality of different locations that each can include one or more buildings that are interconnected by an IP based communication network. For example, the media production studio 100 can include buildings and endpoint devices that are in different time zones or different countries that are communicatively coupled so the endpoint devices can share video and/or audio streams and have synchronized clocks using the IP-based synchronization protocol 135.

Figure 2:
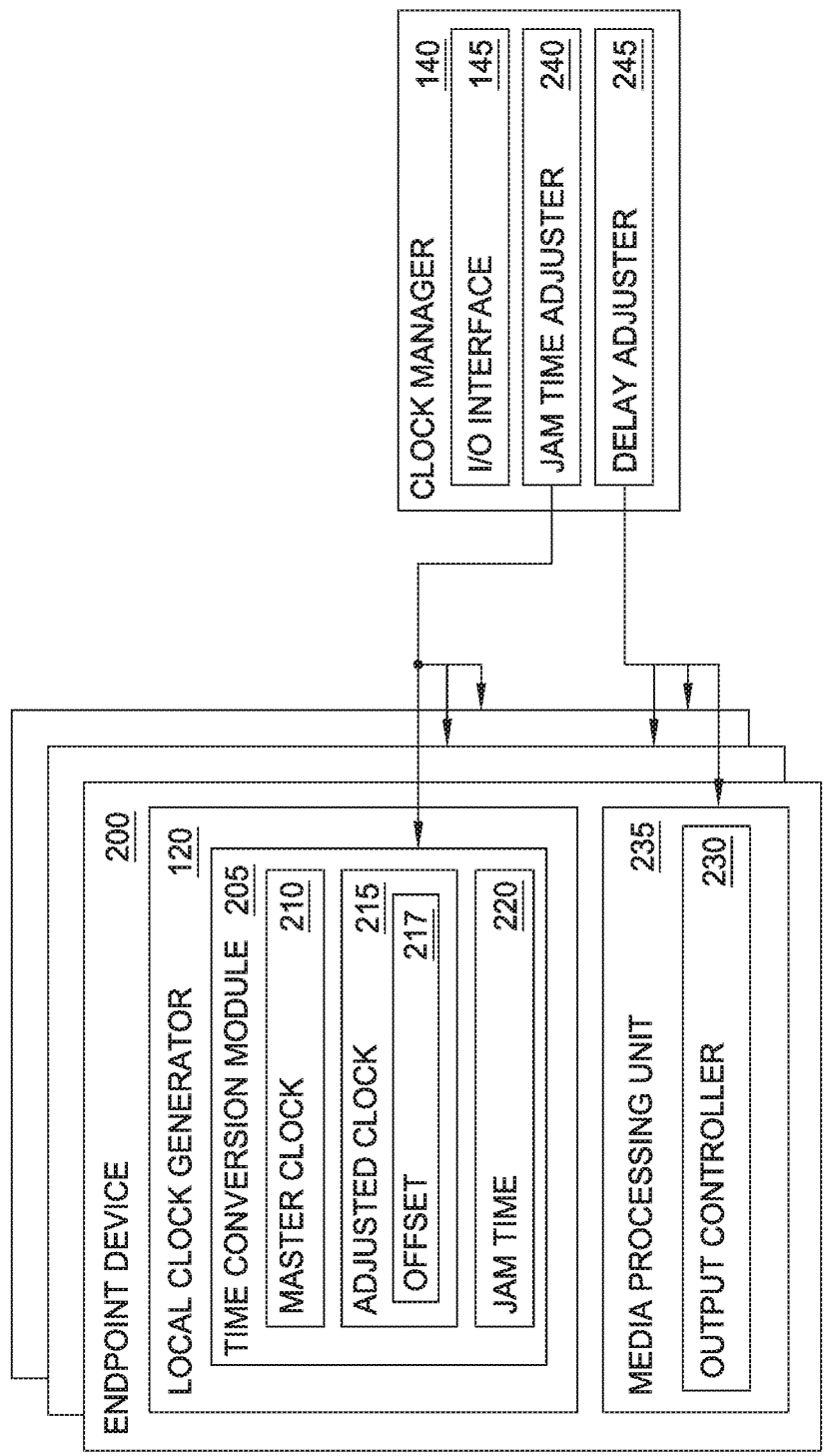
FIG. 2 illustrates adjusting local clock signals in an endpoint device in a media production studio, according to one embodiment described herein.

FIG. 2 illustrates adjusting local clock signals in endpoint devices 200 in a media production studio 100, according to one embodiment described herein. The endpoint devices 200 are communicatively coupled to the clock manager 140 either through a direct connection or through a network—e.g., an IP-based switching network. In FIG. 2, the local clock generator 120 on each of the endpoint devices 200 includes a time conversion module 205 and a phase lock module 225. The time conversion module 205 receives a master clock 210 generated by the IP-based synchronization protocol. The time conversion module 205 converts the master clock 210 into an adjusted clock 215 according to a jam time 220. Stated differently, at the time specified by the jam time 220, the time conversion module 205 resynchronizes the adjusted clock 215 to the master clock 210. In one embodiment, the jam time 220 is used to resynchronize the clocks that use a non-integer video frame rate (as done in the United States and other countries) to real-time clocks that are not based on the same rate. For example, the video frame rate in the United States is 59.94 Hz which means clocks synched to this frame rate drift relative to clocks that are synched to an integer cycle such as the 60 Hz used in power grids in the United States. The jam time 220 resets the clocks on the endpoint devices 200 (which are synched to the non-integer frame rate) with the master clock 210.

As mentioned above, in one embodiment, the master clock 210 may be a TAI clock while the adjusted clock 215 is a UTC clock. The TAI standard, however, does not account for daylight savings or leap seconds but the UTC standard does. Thus, the time conversion module 205 has an offset 217 which can be used to convert the TAI clock value into the UTC clock value at the jam time 220. The offset 217 may be a combination of the offsets resulting from daylight savings and leap seconds. In one embodiment, the offset 217 may also include a manual offset in addition to the time resulting from daylight savings and leap seconds. The manual offset can be used to advance or delay the adjusted clock 215 and is set by the clock manager 140 as described below. To account for drift, the time conversion module 205 may perform the jam time 220 at regular, predefined intervals (e.g., hourly, daily, weekly, etc.) to resynchronize the adjusted clock 215 to the master clock 210.

The endpoint devices 200 may also include a media processing unit 235 which can include software or hardware for generating media data (e.g., video frames or audio data) or processing media data (e.g., mixing two audio or video streams, cutting frames, enhancing colors, switching views, and the like). The media processing unit 235 can use the adjusted clock 215 or the delay signal from the output controller 230 to generate or process the media data. For example, if the endpoint device 200 is a camera, the media processing unit 235 may use the adjusted clock 215 to assign each generated video frame a unique time code or frame code. In another example, if the endpoint device 200 is a video mixer, the media processing unit 235 may use the time codes and the output controller 230 to phase align two video streams so that the view from one camera can be inserted in a the view captured by a different camera.

In other examples, the endpoint device 200 can be a graphics processor, video server, or any other device that generates or modifies a video or audio stream. In one embodiment, the endpoint devices 200 generate media content in a production studio that is immediately viewable by a user. For example, the endpoint devices 200 may mix different camera angles, insert advertisements, insert snipes or other overlay content, and the like to generate the media content. However, although the media content outputted by the endpoint devices 200 can be forwarded to a broadcast network to be immediately viewed by a user such as in a live broadcast, in other embodiments, the media content can be stored in a data center. Later, in response to a request from a user (or according to a predefined broadcast schedule), the media content can be transmitted to the viewer using a video-on-demand service or a television network.

The media processing unit 235 includes an output controller 230 that controls when the media processed by the unit 235 (e.g., video frames) is outputted. In response to delay adjustments received from the clock manager 140, the output controller 230 can adjust the delay to align frames in different video streams. The delay adjustments may dictate when the video streams outputted by the media processing unit 235 are transferred to other components in the endpoint device 200 or to a different device in the media production studio. As described in detail below, the clock manager 140 may adjust the delay corresponding to the output controller 230 so that, when mixing video streams at a downstream device, the first pixel in the first line of the frames outputted by media processing unit 235 aligns with the first pixel in the first line of the frames in another video stream.

The clock manager 140 includes the I/O interface 145, a jam time adjuster 240, and a delay adjuster 245. The I/O interface 145 can be a graphical user interface for receiving instructions from a user, or a communication interface for receiving instructions from a software application. The jam time adjuster 240 and the delay adjuster 245 can include software, hardware, or a combination of both.

The jam time adjuster 240 can change the jam time 220 of the endpoint devices 200. For example, if the jam time 220 is set for midnight, the jam time adjuster 240 can advance or delay the jam time 200 to a different time. This can either be a permanent adjustment or a temporary adjustment. For example, the jam time adjuster 240 may instruct the local clock generator 120 to change the jam time 220 so that the local clock generator 120 resynchronizes to the master clock 210 at 1:00 rather than midnight every day. Conversely, the jam time adjuster 240 may instruct the local clock generator to change the jam time 220 only for one day (e.g., resynchronize to the master clock 210 at 1:00) but continue to use the previous jam time on the following days (e.g., resynchronize to the master clock 210 at midnight).

In another embodiment, the jam time adjuster 240 instructs the local clock generator 120 to resynchronize to the master clock 210 even if the generator 120 has already resynchronized to the master clock 210 that day. That is, the jam time adjuster 240 can provide a new, additional jam time (e.g., at 5:00) that should be performed that day even if the local clock generator has already resynchronized to the master clock 210 at the predefined jam time 220 (e.g., at midnight). The jam time adjuster 240 can instruct the endpoint devices 200 to resynchronize to the master clock 210 any number of times in a day.

In one embodiment, the jam time adjuster 240 changes the offset 217 used by the time conversion module 205 to convert the master clock 210 into the adjusted clock 215. For example, in addition to accounting for daylight savings and leap seconds, the jam time adjuster 240 may further add a manual offset to the offset 217 to add, e.g., advance the adjusted clock 215 to account for a processing delay caused by the media processing unit 235 processing a video stream. For example, the media processing unit 235 may require 0.5 seconds to process the video frames. So that the processed video arrives at a desired time in a downstream device, the jam time adjuster 240 can use the manual offset 217 to advance the adjusted clock 215 by 0.5 seconds to account for the processing delay. Thus, the jam time adjuster 240 can perform sub-second adjustments on the offset 217.

In another example, a producer may instruct the clock manager 140 to change the offset 217 to enable more thorough editing of the video stream. For example, delaying the adjusted clock 215 by an hour from master clock 210 by increasing the offset 217 can give a producer more time to determine how to mix multiple camera angles before the video stream is scheduled for broadcast. That is, the time codes for the captured video frames can be delayed an hour relative to the actual time which is used by a broadcast schedule to determine when the corresponding media content is broadcasted to viewers.

The clock manager 140 uses the delay adjuster 245 to control when the output controller 230 outputs the media content processed by the media processing unit 235. In analog synchronization signals, an engineer could adjust an analog control knob at the endpoint devices to change the output timings of the endpoint devices—i.e., either advance or slow down the edges of a phasing signal. For example, when mixing video streams, the producer could detect that a first video stream inserted in a second video stream (i.e., a picture within a picture) is not at the desired location. For example, the first video stream may be located more towards the center of the second video stream when the producer wishes it to be in the top left of the second video stream. This can result because the first and second video streams arrive at the mixing device at different times. That is, the first pixel in the frames of the first video stream arrives later than the first pixel in the frames of the second video stream. This can be seen by shadowing around the first video stream caused by a key used to block out the underlying portion of the second video stream which can become noticeable if the streams are off by 100 nanoseconds or more. To compensate, the producer instructs the delay adjuster 245 to add or remove a delay used by the output controller 230 which changes the time at which the video stream processed by the media processing unit 235 arrives at the mixing device. For example, causing the first pixel in the frames of the first video stream to arrive earlier can remove the shadowing and cause the videos streams to align as desired. Of course, in another embodiment, the delay adjuster 245 can change the delay used by the media processing unit 235 on the endpoint device 200 that outputs the second video stream such that the second video stream arrives later at the mixing device (or some combination of both).

Rather than using analog signals to control phasing, the delay adjuster 245 can send digital delay commands that include precise delay values used by the output controller 230 for controlling the output of the media content. For example, the digital delay commands may include delays that are less than 100 milliseconds to align video streams as described above.

Figure 3:
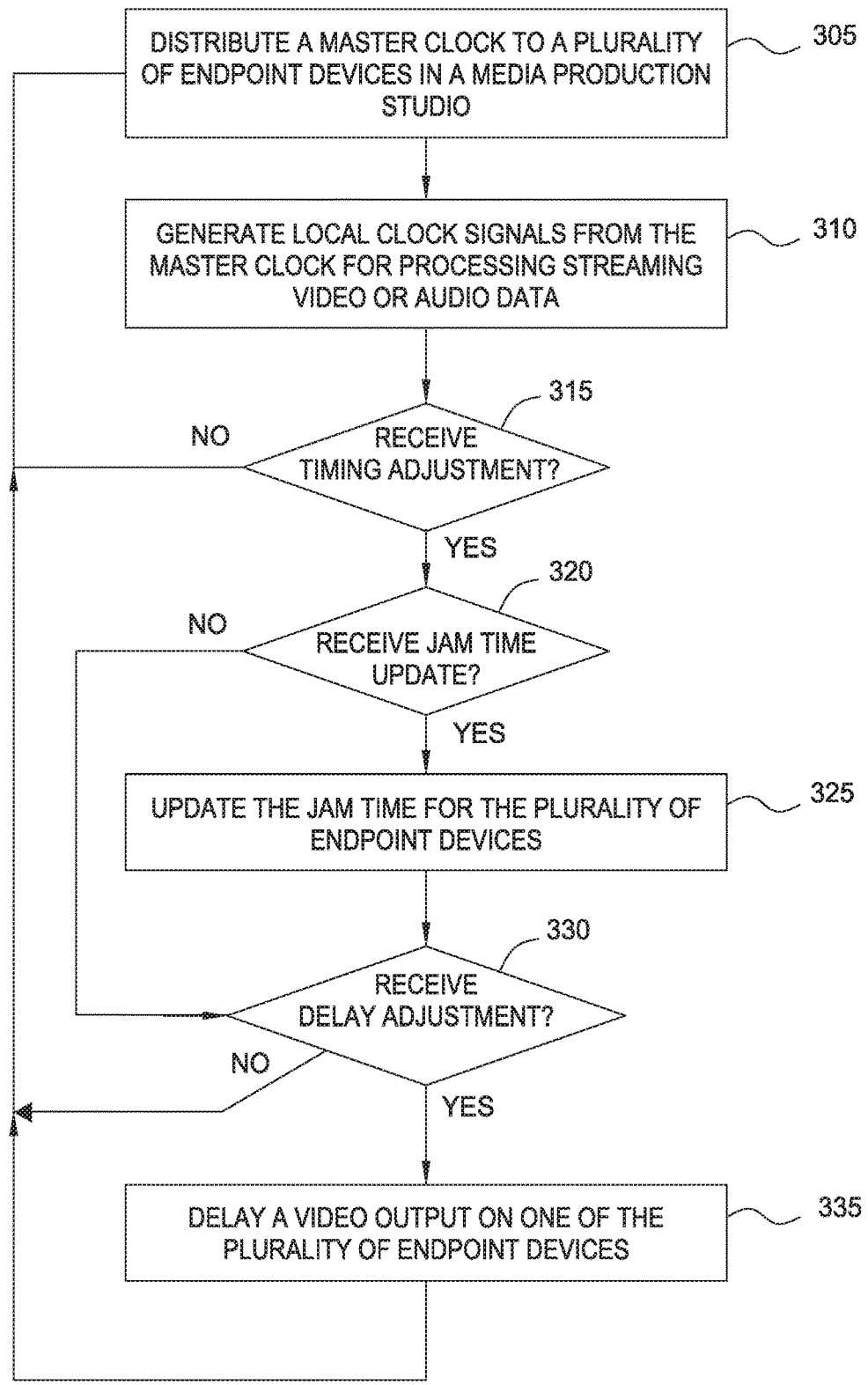
FIG. 3 is a flowchart for adjusting local clock signals in an endpoint device in a media production studio, according to one embodiment described herein.

FIG. 3 is a flowchart of a method 300 for adjusting local clock signals in an endpoint device in a media production studio, according to one embodiment described herein. At block 305, a media production studio distributes a master clock to a plurality of endpoint devices using an IP-based synchronization protocol. In one embodiment, the IP-based synchronization protocol (e.g., PTP as defined by SMPTE 2059) uses digital signals to transmit the clock rather than analog signals. Further, the master clock may be transmitted on an IP-based network (e.g., a WAN or LAN) which is also used by the endpoint devices to transmit video or audio streams.

At block 310, local clock generators on the endpoint devices generate local clock signals from the master clock for generating or processing streaming video or audio data. As described above, the local clock generators may use an offset to convert the master clock into an adjusted clock. The adjusted clock can be used to generate time codes, frame codes, or timestamps that can be assigned to respective video frames. Moreover, the endpoint devices can use the adjusted clock to synchronize different video streams by identifying frames that have the same time codes. In another example, the times codes can be compared to a broadcast schedule to determine when the corresponding frames should be made available to a viewer.

The offset can account for daylight savings, leap seconds, and a transmission delay between the master clock generator and the endpoint devices. That is, the master clock may take a 1-10 nanoseconds to travel between the master clock generator and the endpoint device which means the master clock received at the endpoint device may be delayed relative to the actual time. The offset can compensate for this transmission delay when calculating the adjusted clock. Moreover, the offset can include a manual offset set by the clock manager to account for, e.g., processing delays and production edits.

In addition, the local clock generators can lock onto a frequency component of the master clock to output a delay signal which determines when video and audio data is processed in the endpoint device or transmitted to a different endpoint device. When mixing two video streams, the first pixels in the frames of the two video streams may arrive at different times. For example, the cables between the endpoint devices providing the video streams and a mixing device may have different lengths which add different transmission delays to the video streams traveling on the cables. Thus, although the endpoint devices can use the offset to adjust the local clock signals to account for delays between the master clock generator and the endpoint devices, the endpoint devices may not have an offset for accounting for delays caused by transmitting the media streams to different endpoint devices or delays resulting from processing the streams internally. As mentioned above, these delays can cause undesirable results when mixing two video streams and the video streams do not overlap as intended.

At block 315, a clock manager determines if a timing adjustment is received from an engineer, producer, software application, or the like. For example, a producer may want to change the offset used when synchronizing the adjusted clock to the master clock in order to account for processing delays and production edits. In response, the clock manager transmits the new offset to one or more of the endpoint devices. In another example, a software application may monitor the streaming media content and identify (without human intervention) that the two video streams are not aligned properly when being mixed. In response, the software application may alert the clock manager to output a delay adjustment to one or more of the upstream endpoint devices providing video streams to the video mixer.

At block 320, the local clock generators in the endpoint devices determine if they have received a jam time update from the clock manager. If so, the method 300 proceeds to block 325 where the local clock generators update the jam time. For example, the local clock generator may change the current jam time to earlier or later in the day. In another example, the local clock generator may add additional jam times throughout the day. In any case, when the jam time is reached, the local clock generator uses the previous or an updated offset to convert the master clock into the adjusted clock thereby resynchronizing the master clock with the adjusted clock.

If the endpoint devices did not receive a jam time update, the method 300 proceeds to block 330 where the local clock generators determine whether they received a delay adjustment. If so, the method 300 proceeds to block 335 where the output controller changes the delay corresponding to media content being outputted by a media processing unit in the endpoint device. Doing so may affect downstream processing in the endpoint devices which can alter when streaming data is received at a mixing device. As explained above, changing the output delay can compensate for internal delays or transmission delays in, or between, the endpoint devices. As a result, the clock manager can alter how the video and audio streams propagate through the media production studio by changing the output delay for the media processing units or applications on the endpoint devices.

The method 300 can return to block 305 and repeat. That is, the clock manager can continually receive timing adjustments which can change the jam time, offsets, and the phasing signals on the endpoint devices. Moreover, although the clock manager can change the timing parameters for all the endpoint devices in the media production studio in unison, the clock manager can also select which ones of the endpoint devices receive the timing parameters which is described in more detail below.

Figure 4:
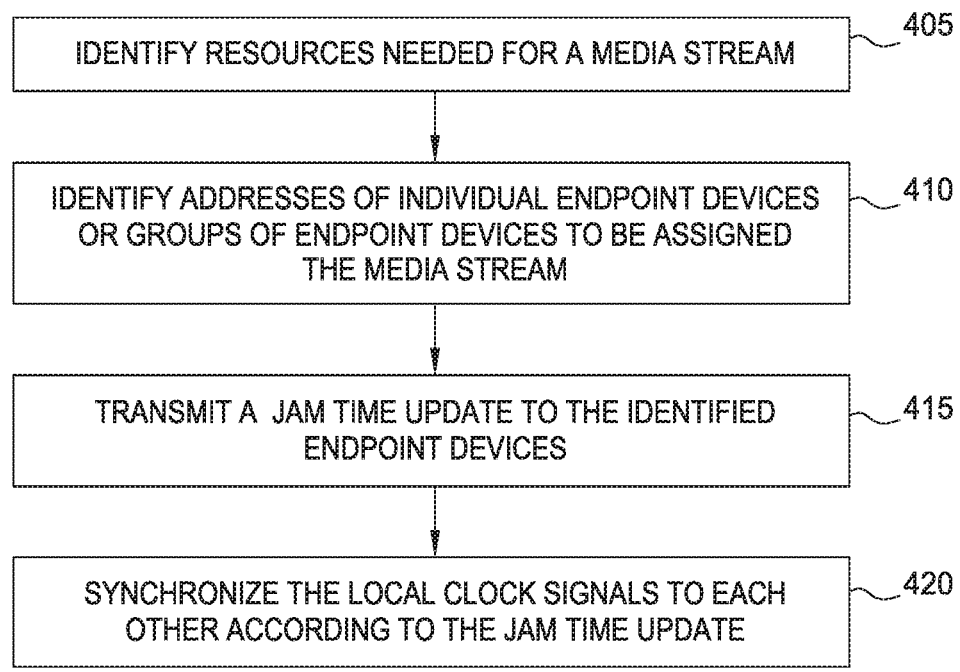
FIG. 4 is a flowchart for selectively adjusting clock signals for a plurality of endpoint devices, according to one embodiment described herein.

FIG. 4 is a flowchart of a method 400 for selectively adjusting clock signals for a plurality of endpoint devices, according to one embodiment described herein. At block 405, the clock manager identifies resources needed for a media stream. In one embodiment, an engineer may provide a list of endpoint devices that will be used to generate a media stream. Alternatively, an application may generate a list of endpoint devices based on a predefined template corresponding to a type of the media stream—e.g., depending on whether the media stream is a news broadcast, a sporting event, a concert, a television production, etc. For example, a news broadcast may require at least one camera and a video processing device. In contrast, a cooking show may require multiple cameras and a mixing device for simultaneously providing different views to the viewer (e.g., a top view which is embedded in a front view).

In one embodiment, the endpoint devices may be organized or assigned into groups that perform special tasks. For example, multiple endpoint devices may be assigned into groups that can capture, process, modify, and output a media stream. Put differently, a group may contain all the necessary endpoint devices for generating the media stream from start to finish. In another example, the endpoint devices may be organized into groups that perform a specific task. For example, one group could contain the endpoint devices necessary for mixing multiple camera angles into a single video stream. The group may contain video servers, graphics processing devices, and mixers through which multiple video streams are passed in order to generate a single, combined video stream. Thus, depending on the media stream, the engineer may select one or more groups of endpoint devices.

Once the needed endpoint devices are identified, at block 410, the clock manager identifies addresses of individual endpoint devices or groups of endpoint devices to be assigned to the media stream. In one embodiment, the endpoint devices are coupled to an IP-based network in which case the IP addresses may uniquely identify the endpoint devices. However, any communication scheme that permits the clock manager to selectively send timing adjustments to the endpoint devices can be used.

If a group is selected, the clock manager may use a group address (e.g., a multicast address) to communicate with each endpoint device in the group. Alternatively, the clock manager could identify each endpoint device in the group and transmit individual instructions to each group member separately (e.g., a unicast address). In one embodiment, the endpoint devices may be located in separate PTP domains. For example, endpoint devices located at different campuses or geographic locations can be in different PTP domains as described by SMPTE 2059.

At block 415, the clock manager transmits a jam time update to the identified endpoint devices. In one embodiment, the jam time update synchronizes the clocks of the identified endpoint devices, which may be disposed in different PTP domains. Put differently, once the jam time is reached, the adjusted clocks of the endpoint devices have the same value. For example, the clock manager may instruct the endpoint devices to immediately synchronize their clocks. In another embodiment, the clock manager may provide a delayed jam time that corresponds to a future time when the media content should start being generated.

At block 420, the identified endpoint devices synchronize the local clock signals to each other according to the jam time update. After synchronizing, the adjusted clocks on each of the endpoint devices are the same.

In one embodiment, the identified endpoint devices may be in separate time zones or in different countries. Thus, before synchronizing the clocks, the endpoint devices could have different adjusted clocks. When sending out the jam time update, the clock manager can account for the different locations of the identified endpoint device by sending customized offsets to the endpoint devices. For example, if a first one of the endpoint devices is in a different time zone than the other identified endpoint devices, the clock manager can change the offset used by the first endpoint device such that when it synchronizes, it has the same adjusted clock as the other identified endpoint devices.

Figure 5A:
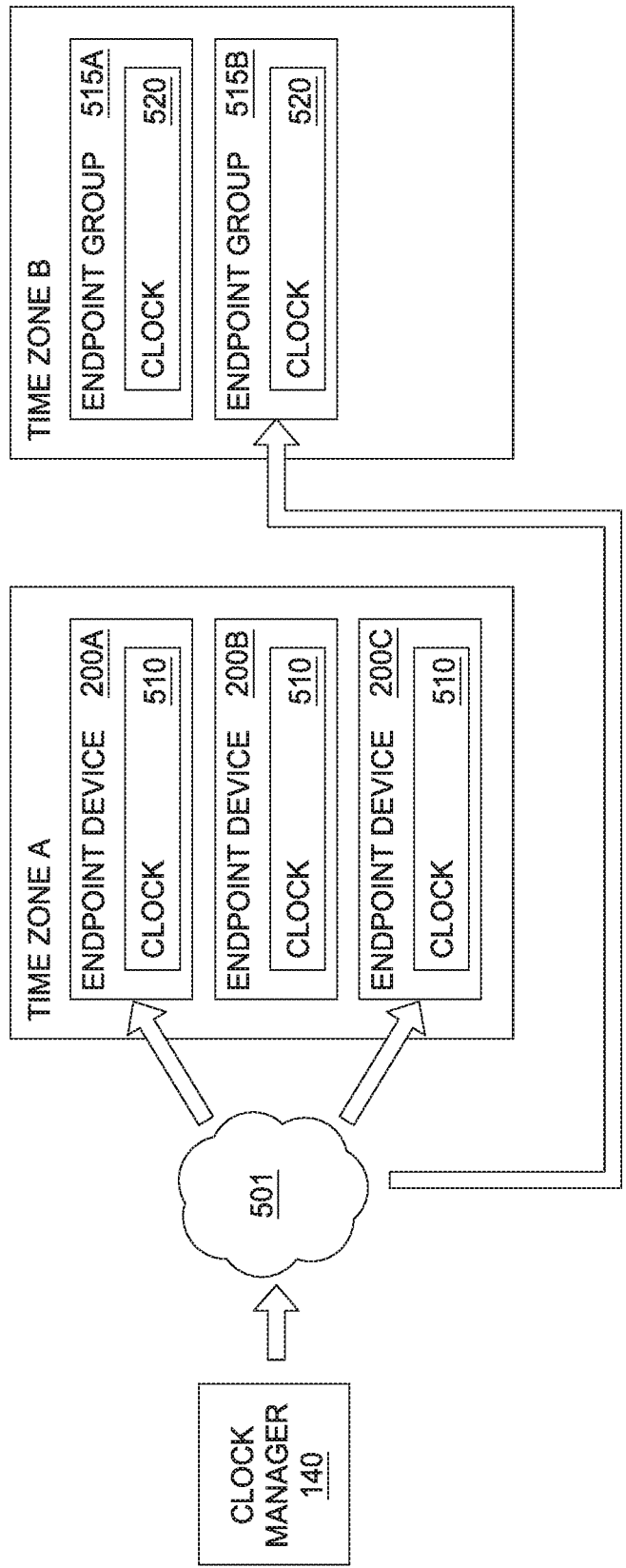
FIGS. 5A-5B illustrate a system for selectively adjusting clock signals for a plurality of endpoint devices, according to one embodiment described herein.
Figure 5B:
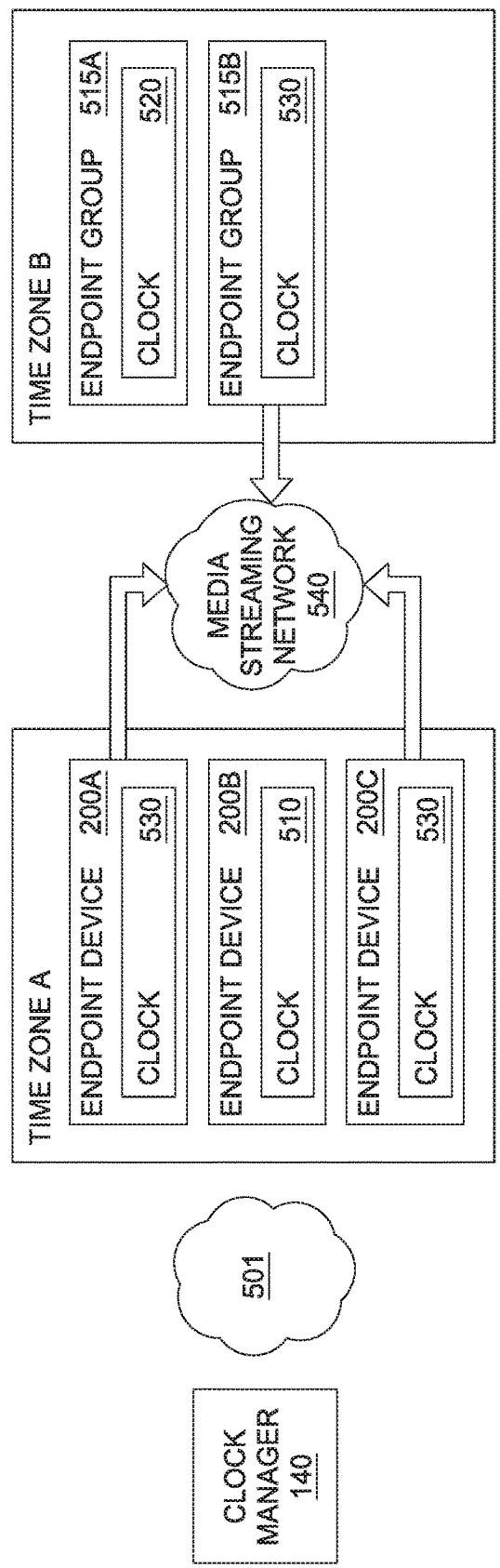

FIGS. 5A-5B illustrate a system for selectively adjusting clock signals for a plurality of endpoint devices, according to one embodiment described herein. FIG. 5A illustrates the clock manager communicatively coupled to endpoint devices 200 and endpoint groups 515 that are located in at least two time zones. The endpoint devices 200 represent single devices while the endpoint groups 515 include multiple endpoint devices 200 assigned to do a common task or tasks. The endpoint devices 200 and the endpoint groups 515 can be located in the same country or in different countries. Moreover, the endpoint devices 200 can be located in different PTP domains, which may originate from diverse grandmaster clocks.

A producer or software application can inform the clock manager 140 which of the endpoint devices 200 should be used to generate a media stream. In this example, the endpoint devices 200A and 200C in Time Zone A are selected along with endpoint group 515B in Time Zone B to generate the media stream. For example, the endpoint devices 200A and 200C may be cameras that are used to capture an event occurring at the location of these devices 200A and 200C. However, the endpoint group 515B may include devices for mixing the video streams generated by the cameras, and thus, are also selected. As described below, it is not necessary for the endpoint devices used to generate and process the media content to be in the same building, campus, PTP domain, or the same time zone.

As shown, the endpoint devices 200 in Time Zone A have the same clock 510. However, the endpoint groups 515 in Time Zone B have a different cock 520. For example, Time Zone A may be the Eastern Time Zone in the United States while Time Zone B is the Central Time Zone in the United States. Thus, the clocks 510 may be an hour ahead of the clocks 520. Put differently, when calculating the clock values using the master clock, the end point devices 200 may use a different offset than the endpoint devices in the endpoint groups 515 to account for the different time zones.

Once the endpoint devices are identified, the clock manager 140 uses an IP-based network 501 to transmit a jam time update to the identified devices. In this case, the endpoint devices 200A and 200C and the endpoint group 515B receive the jam time update while the endpoint device 200B and the endpoint group 515A do not. In one embodiment, the clock manager 140 transmits an updated offset to the devices in the jam time update. Because of the difference in time zones, the current offsets stored in the endpoint devices are different. In one embodiment, the clock manager 140 transmits a common offset to the identified endpoint devices or groups of endpoint devices so that after synchronization is performed, the devices have the same clock.

FIG. 5B illustrates the state of the media production studio after the identified endpoint devices have synchronized their clocks. As shown, the endpoint devices 200A and 200C and the endpoint group 515 all have a same clock 530. That is, at the specified jam time, these endpoint devices use the offset received at the time shown in FIG. 5A to calculate adjusted clocks (i.e., the clocks 530) from the master clock (e.g., a PTP master clock). In one embodiment, the clocks 530 of the identified endpoint devices may be the same as clocks of other endpoint devices in the same time zone. For example, the clocks 530 may be the same value of the clock 510 in Time Zone A. However, in other embodiments, the clocks 530 may have a different value from both Time Zones A and B. For example, the offset used to generate the clocks 530 may have a profanity delay or a delayed transmission to provide time for the media content to be edited before being made available to a viewer. In that case, the clocks 530 have a value different from both the clock 510 and the clock 520.

Once synchronized, the time codes assigned to the frames can be referenced using the same clock 530 between the identified endpoint devices. As shown, a media streaming network 540 can be used to share media content between the identified endpoint devices. In one embodiment, the media streaming network 540 may be the same as (or a part of) the IP network 501 used by the clock manager 140 to communicate with the endpoint devices. However, in other embodiments, the two networks may be separate communication networks.

Because the clocks 530 in the endpoint device 200A, the endpoint device 200C, and the endpoint group 515B are synchronized, the time codes or timestamps corresponding to the media content are referenced to the same clock. For example, if the endpoint device 200A assigns a time code to a video frame in a first video stream at the same time the endpoint device assigns a time code to a video frame in a second video stream, the endpoint group 515B can know by examining the time codes that the video frames in the two streams were generated at the same time. Thus, if mixing the video streams, the endpoint group 515B can know which frames to mix in order to combine frames that were captured at the same point of time.

As shown in FIGS. 5A and 5B, the clock manager 140 can synchronize the clocks in endpoint devices that are disposed in different time zones to generate and process a media stream. Once the media stream is finished, the clock manager 140 can transmit a new jam time update which instructs the endpoint devices 200A and 200C and the endpoint group 515B to resynchronize using their previous offsets. As a result, the endpoint devices 200A and 200C would have the same adjusted clock as the endpoint device 200B in Time Zone A and the endpoint group 515B would have the same adjusted clock as the endpoint group 515A. Because the clock manager 140 serves as a common control point, the various resources in a media production studio (even if those resources are in different buildings, campuses, countries, or time zones) can be immediately used to generate media content in concert and then returned for other uses without requiring a person to change settings on each of the endpoint devices.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   distributing a master clock signal using an internet protocol (IP)-based synchronization protocol to a plurality of endpoint devices in a media production studio;
   receiving a timing adjustment from a clock manager communicatively coupled to the plurality of endpoint devices;
   generating, based on the master clock signal, local clock signals using local clock generators on the plurality of endpoint devices, wherein the clock manager is a common point of control of the local clock generators, and wherein generating the local clock signals comprises:
      in response to determining that a predefined jam time has been reached, adjusting the master clock signal based on an offset to result in the local clock signals, wherein the offset accounts for at least one of daylight savings and leap seconds, and wherein the offset also comprises a manual offset provided by the clock manager to at least one of the plurality of endpoint devices; and
   adjusting the local clock signals on the plurality of endpoint devices based on the received timing adjustment.

2. The method of claim 1, further comprising:
   generating time codes using the local clock signals; and
   assigning the time codes to respective frames in a video stream, wherein the time codes uniquely identify the frames in the video stream.

3. The method of claim 1, wherein the timing adjustment comprises a delay adjustment which affects how video frames are transmitted between the plurality of endpoint devices in the media production studio, and wherein the delay adjustment compensates for internal delays between the plurality of endpoint devices.

4. The method of claim 3, further comprising:
   mixing a first video stream and a second video stream to generate a picture in a picture, wherein the delay adjustment alters a location of the first video stream in the second video stream.

5. The method of claim 1, wherein the IP-based synchronization protocol is based on Precision Time Protocol (PTP).

6. The method of claim 5, wherein the IP-based synchronization protocol is in compliance with Society of Motion Picture & Television Engineers (SMPTE) 2059.

7. A method, comprising:
   distributing a master clock signal using an internet protocol (IP)-based synchronization protocol to a plurality of endpoint devices in a media production studio;
   generating, based on the master clock signal, local clock signals using local clock generators on the plurality of endpoint devices;
   receiving a timing adjustment from a clock manager communicatively coupled to the plurality of endpoint devices, wherein the clock manager is a common point of control of the local clock generators;
   adjusting the local clock signals on the plurality of endpoint devices based on the received timing adjustment; and
   wherein the timing adjustment comprises a jam time update, wherein the jam time update at least one of (i) adds a new jam time during which the local clock generators resynchronize the local clock signals to the master clock signal and (ii) changes a predefined jam time to a different time, wherein the predefined jam time indicates a predefined interval at which the plurality of endpoint devices resynchronize the local clock signals.

8. A method, comprising:
   distributing a master clock signal using an internet protocol (IP)-based synchronization protocol to a plurality of endpoint devices in a media production studio;
   generating, based on the master clock signal, local clock signals using local clock generators on the plurality of endpoint devices;
   receiving a timing adjustment from a clock manager communicatively coupled to the plurality of endpoint devices, wherein the clock manager is a common point of control of the local clock generators; and
   adjusting the local clock signals on the plurality of endpoint devices based on the received timing adjustment wherein the local clock signals are not slaved to the master clock signal such that a change to the master clock signal does not automatically result in a change to the local clock signals.

9. A non-transitory computer readable storage medium comprising:
   computer-readable program code for verifying a media presentation, wherein, when executed by a computing processor, the computer-readable program code performs an operation comprising:
   distributing a master clock signal using an Internet Protocol (IP)-based synchronization protocol to a plurality of endpoint devices in a media production studio;
   generating, based on the master clock signal, local clock signals using local clock generators on the plurality of endpoint devices;
   receiving a timing adjustment from a clock manager communicatively coupled to the plurality of endpoint devices, wherein the clock manager is a common point of control of the local clock generators;

adjusting the local clock signals on the plurality of endpoint devices based on the received timing adjustment; and wherein generating the local clock signals comprises:

in response to determining that a predefined jam time has been reached, adjusting the master clock signal based on an offset to result in the local clock signals, wherein the offset accounts for at least one of daylight savings and leap seconds, and wherein the offset also comprises a manual offset provided by the clock manager to at least one of the plurality of endpoint devices.

10. The non-transitory computer readable storage medium of claim 9, wherein the timing adjustment comprises a jam time update, wherein the jam time update at least one of (i) adds a new jam time during which the local clock generators resynchronize the local clock signals to the master clock signal and (ii) changes a predefined jam time to a different time, wherein the predefined jam time indicates a predefined interval at which the plurality of endpoint devices resynchronize the local clock signals.

11. The non-transitory computer readable storage medium of claim 9, wherein the timing adjustment comprises a delay adjustment which affects how video frames are transmitted between the plurality of endpoint devices in the media production studio, and wherein the delay adjustment compensates for internal delays between the plurality of endpoint devices.

12. The non-transitory computer readable storage medium of claim 11, wherein the operation further comprises:

mixing a first video stream and a second video stream to generate a picture in a picture, wherein the delay adjustment alters a location of the first video stream in the second video stream.

13. A media production studio, comprising:
a plurality of endpoint devices;
a master clock generator configured to distribute a master clock signal using an Internet Protocol (IP)-based synchronization protocol to the plurality of endpoint devices, wherein the plurality of endpoint devices are configured to generate, based on the master clock signal, local clock signals using local clock generators; and a clock manager configured to transmit a timing adjustment to the plurality of endpoint devices, wherein the clock manager is a common point of control of the local clock generators, wherein the local clock generators are configured to adjust the local clock signals on the plurality of endpoint devices based on the timing adjustment, wherein the clock generators are configured to determine that a predefined jam time has been reached, and wherein the clock generators are configured to adjust the master clock signal in response to determining that the predefined jam time has been reached and based on an offset to result in the local clock signals, wherein the offset accounts for at least one of daylight savings and leap seconds, and wherein the offset also comprises a manual offset provided by the clock manager to at least one of the plurality of endpoint devices.

14. The media production studio of claim 13, wherein the timing adjustment comprises a jam time update, wherein the jam time update at least one of (i) adds a new jam time during which the local clock generators resynchronize the local clock signals to the master clock signal and (ii) changes a predefined jam time to a different time, wherein the predefined jam time indicates a predefined interval at which the plurality of endpoint devices resynchronize the local clock signals.

15. The media production studio of claim 13, wherein the timing adjustment comprises a delay adjustment which affects how video frames are transmitted between the plurality of endpoint devices, and wherein the delay adjustment compensates for internal delays between the plurality of endpoint devices.

16. The media production studio of claim 13, wherein the local clock signals are not slaved to the master clock signal such that a change to the master clock signal does not automatically result in a change to the local clock signals.

* * * * *